Figure 1:
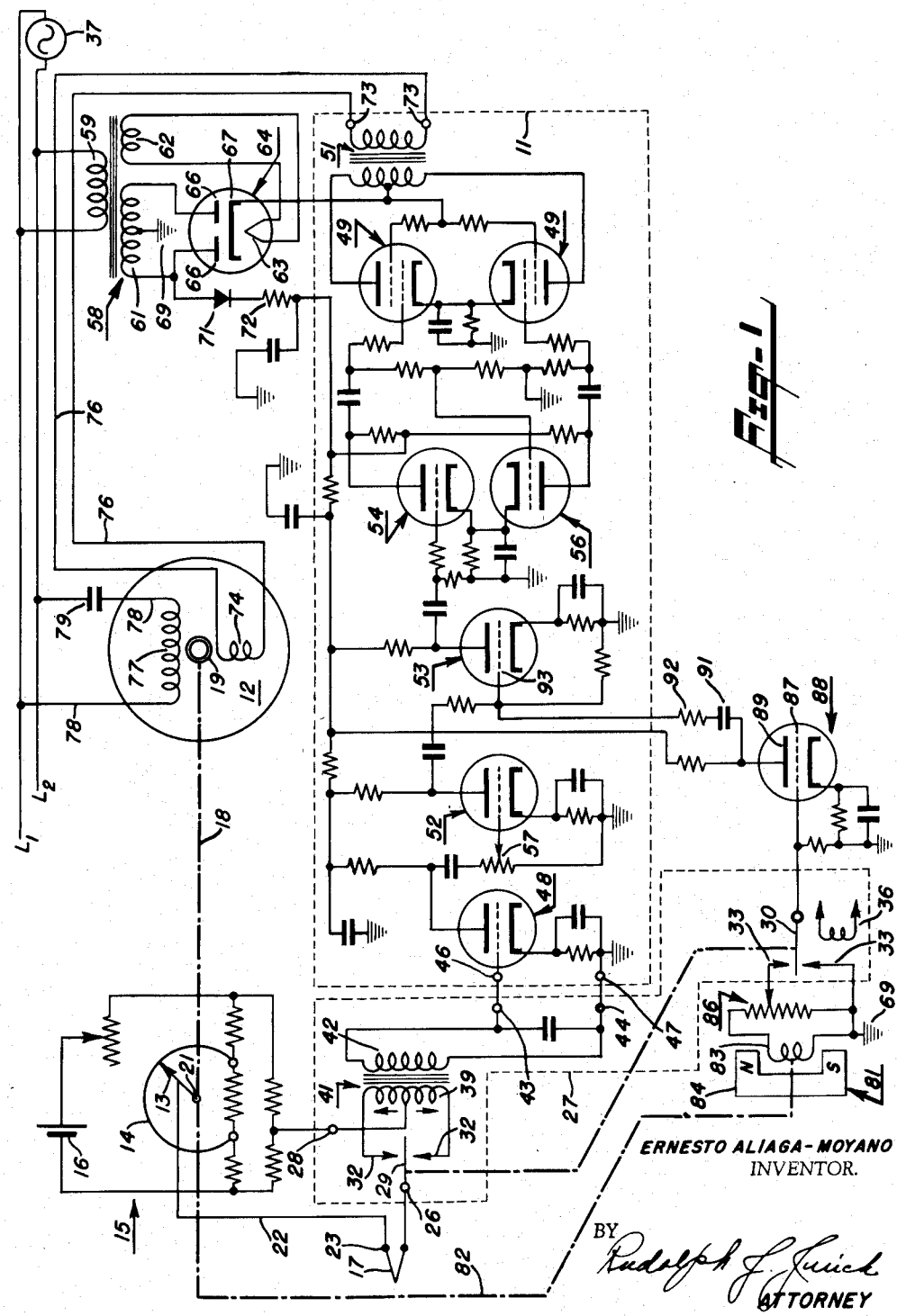

Sept. 26, 1961  E. ALIAGA-MOYANO  3,002,141
DAMPING ARRANGEMENT
Filed April 1, 1958  2 Sheets-Sheet 2

ERNESTO ALIAGA-MOYANO
INVENTOR.

BY Rudolph J. Juick
ATTORNEY

United States Patent Office 3,002,141
Patented Sept. 26, 1961

3,002,141
DAMPING ARRANGEMENT
Ernesto Aliaga-Moyano, Bronx, N.Y., assignor to Daystrom, Incorporated, Murray Hill, N.J., a corporation of New Jersey
Filed Apr. 1, 1958, Ser. No. 725,745
6 Claims. (Cl. 318—448)

This invention relates to an automatic, self-balancing, recorder and/or controller and more particularly to a novel and effective arrangement for providing damping to prevent overshooting and/or hunting of the self-balancing system.

Recorders and automatic control systems of the class contemplated by this invention respond to mechanical, electrical, chemical or other physical changes of a condition in order to effect a record of the changes, or to maintain predetermined physical conditions at controlled points. The damping arrangement is adapted for use with various types of circuitry including potentiometric, Wheatstone bridge, and current balancing circuits. For purposes of explanation, however, the damping arrangement is shown and described in a potentiometric type instrument.

The potentiometric self-balancing arrangement includes a contact engaging a resistance wire included in a sensitive measuring circuit, such contact being automatically adjusted along the resistance wire to balance the E.M.F. of a thermocouple, or the potential being measured, or controlled, against the potential drop in a portion of the measuring circuit that includes more or less of the said resistance wire. Inasmuch as the sliding contact and the associated source of mechanical power, connecting mechanism, etc., includes some mass, a system of this type is likely to hunt about the balance point before a true static balance is obtained. Numerous proposals have been advanced to overcome such hunting without significantly affecting the speed of response of the apparatus to a change in the condition being measured or controlled. Such prior apparatus has often been costly, cumbersome, and ineffective.

An object of this invention is the provision of a simple arrangement for damping the movable mechanism of self-balancing type instruments.

An object of this invention is the provision of an electrical braking arrangement to prevent overshooting and/or hunting of the corrective member of a servo-mechanism as it approaches the balance point of the system of which the mechanism is a part.

An object of this invention is the provision of an electrical braking means for the rebalancing motor of a self-balancing recorder and/or controller, said braking means including as an element thereof a D.-C. instrument movement.

An object of this invention is the provision of a motor control apparatus including a controlled motor, a control signal source, an amplifier including a plurality of stages of amplification connecting the said control signal source to the said controlled motor, a direct current instrument movement having a D.-C. motor damping output signal proportional to the speed of rotation of the said motor, and means connecting the said motor damping output signal to the said amplifier at an intermediate stage thereof in opposition to the control signal thereat.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

Figure 2:
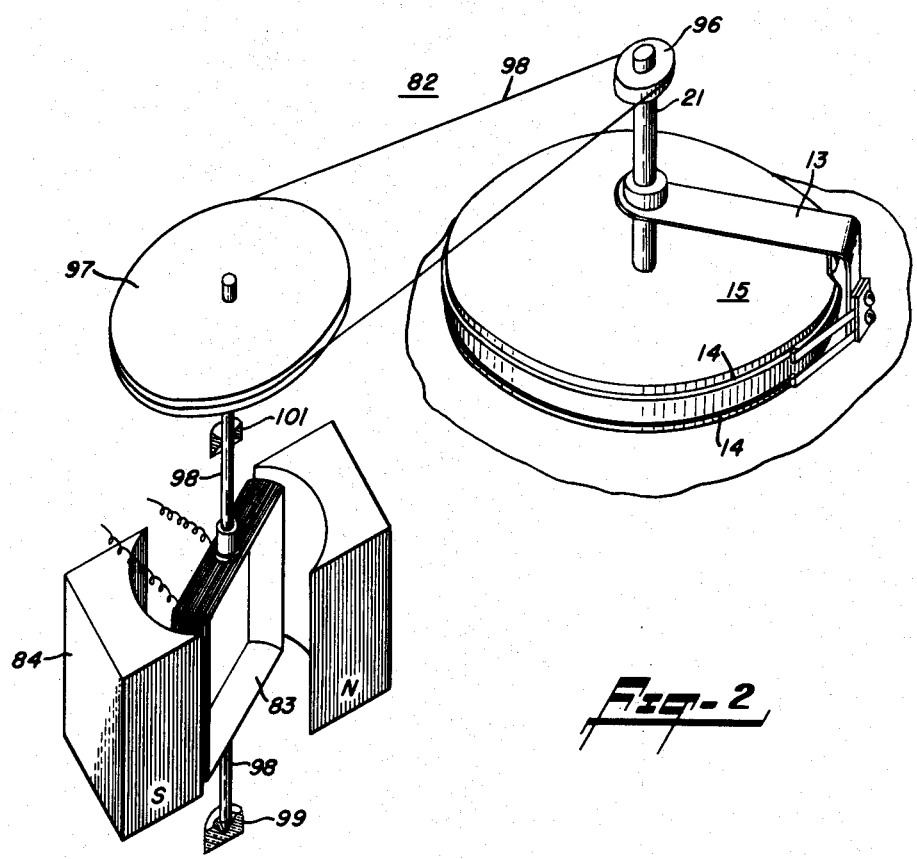

In the drawings wherein like reference characters denote like parts in the several views:

FIGURE 1 is a diagrammatic representation of a self-balancing type instrument employing my novel damping arrangement; and FIGURE 2 is a fragmentary diagrammatic perspective view of the slidewire potentiometer, the D.-C. movement, and the mechanical connection therebetween.

Referring first to FIGURE 1 of the drawings, there is illustrated in schematic form an arrangement including an electronic amplifier 11 and an electric reversible two-phase motor 12 for actuating a movable contact 13 along a slidewire resistor 14 of a null-point potentiometric network designated generally by the reference number 15. The network 15 includes a source of D.-C. potential 16 connected across the slidewire 14 through suitable network resistors in a usual manner. The arrangement shown may be used to measure and record the temperature of a furnace (not shown) in which a thermocouple 17 is positioned and is responsive to changes of temperature therein. The movable contact 13 of the potentiometer is adapted to be driven by the motor 12 through the mechanical connection 18 between the motor shaft 19 and potentiometer shaft 21; the connection being illustrated by a broken line in FIGURE 1. While the connection may include gearing, or other suitable connecting means, for a high speed system, a light weight pulley arrangement has been found to function well.

An electrical conductor 22 connects the movable contact 13 with one terminal 23 of the thermocouple 17, while the other terminal 24 of the thermocouple is connected to one input terminal 26 of a chopper circuit 27. A second input terminal 28 of the chopper is connected to the potentiometric network 15. It will be understood that the potential generated by the thermoelement 17 can be balanced by the potential drop developed across the potentiometric network 15. When the two voltages are equal, the system is in balance. However, when an unbalance occurs, upon a change in the voltage developed by the thermocouple, the reversible motor 12 is energized to rotate the movable contact 13 along the slidewire 14 so as to rebalance the system.

The chopper circuit 27 converts the potentiometric unbalance direct currents into A.-C. control signal currents which are easily amplified. In addition, an extra set of contacts in the chopper are used to convert a D.-C. damping signal into an A.-C. damping signal of the same frequency as the A.-C. control signal, as described below. The chopper may be of any desired form and has been illustrated in the drawing as comprising an electromagnetic switch having a pair of movable contacts 29 and 30, and cooperating stationary contacts 32, 32 and 33, 33, respectively. A coil 36 is connected, by means not shown, to supply lines $L_1$ and $L_2$ which, in turn, are connected to an A.-C. reference voltage obtained, for example, from an ordinary 60 cycle, 115 volt source, designated 37. When the coil 36 is energized by the A.-C. source of potential 37, the movable contacts 29 and 30 are synchronously actuated. It will be apparent that any unbalance voltage which appears at the chopper input terminals 26 and 28 is applied alternately to the contacts 32, 32 which are connected to the ends of the center-tapped primary winding 39 of the transformer 41. The D.-C. unbalance potential will result in a current flow through one-half of the transformer primary winding 39 which is in the upward direction during one-half cycle of the reference potential, and a current flow in the other one-half of the transformer primary winding 39 which is in the downward direction during the other one-half cycle of the reference potential. Such current flow directions are shown by the arrows adjacent the transformer primary winding 39 for a situation wherein the input terminal 26 is positive and the input terminal 28 is negative. As a result of such primary winding currents, an A.-C. signal appears at the transformer secondary winding 42 and, thus, at the chopper circuit output terminals 43, 44. It will be noted that because the coil 36 in the chopper circuit 24 is energized by the A.-C. reference potential 37, the output A.-C. error signal from the chopper terminals 43, 44 will either be in phase with the potential reference source 37 or displaced 180 degrees out of phase therewith, depending upon the polarity of the D.-C. unbalance signal between the thermoelement 17 and the potentiometric network 15.

The A.-C. error, or unbalance control signal from the chopper circuit output terminals 43, 44 is fed to the input terminals 46, 47 of the A.-C. amplifier 11. The amplifier comprises a plurality of stages of amplification, including an input, output, and at least one intermediate stage. The input stage, illustrated in FIGURE 1, includes the electron tube 48, while the output stage thereof includes the electron tubes 49, 49 connected to operate in a push-pull manner through the output transformer 51. The system illustrated is provided with a plurality of intermediate stages which include the electron tubes 52, 53 and 54. A phase inverter stage which includes the electron tube 56 is also provided. The output from the final intermediate stage tube 54 is fed to one of the push-pull amplifier tubes 49 directly, and to the other tube thereof through the phase inverter stage, in the usual manner, whereby proper out-of-phase driving signals are supplied to the push-pull amplifier.

A sensitivity control potentiometer 57 is included in the amplifier between the input stage and first intermediate stage of amplification whereby the system sensitivity is easily adjusted. As will become apparent in the description below, one important feature of my invention is that the sensitivity control potentiometer 57 may be adjusted for the proper system operation without effecting the damping signal setting.

D.-C. supply voltages for the amplifiers are provided by a power transformer 58 having a primary winding 59 connected to the supply lines L₁ and L₂. The transformer 58 is provided with high and low voltage secondary windings 61 and 62, respectively; the low voltage winding 62 being connected to the filament 63 of the full wave rectifier tube 64, while the high voltage winding 61 is connected to the rectifier tube anodes 66, 66. A center tap on the high voltage winding 61 is connected to a common ground connection 69. The cathode 67 of the rectifier is connected to the center tap on the primary winding 68 of the output transformer 51 in the amplifier 11, and supplies the necessary anode and screen grid potentials to the push-pull amplifier tubes 49, 49 in the usual manner.

D.-C. supply potentials for the remainder of the amplifier stages are provided through a series connected rectifier and resistor 71 and 72, which are connected to one end of the high voltage winding 61. The resulting half-wave rectifier is sufficient to provide the necessary supply potentials for the remainder of the amplifier.

It will be understood that the A.-C. error, or unbalance, control signal from the chopper circuit output terminals 43, 44 is amplified by the input, intermediate and output stages of the amplifier 11 whereby there appears at the amplifier output terminals 73, 73 an alternating current also having a predetermined phase relation with respect to that of the A.-C. source of potential 37, and whose magnitude is dependent upon the potential applied to the amplifier input terminals up to the point that the amplifier saturates. Any signal at the amplifier input in excess of that which saturates the amplifier, obviously, will not be felt at the amplifier output. The amplified signal is taken from the amplifier output terminals 73, 73 and applied to the control winding 74 of the reversible, two-phase, motor 12 through the electrical conductors 76, 76. The reference winding 77 of the two-phase motor 12 is connected to the A.-C. reference potential source 37 through the leads 78, 78 and a capacitor 79. Reaction between the field set up by the control winding 74 and that set up by the reference winding 77 causes the motor armature to rotate in one direction or the other depending upon the relative phase between the currents in the two windings. The direction and extent of the motor rotation is controlled by the direction and amount of unbalance of the potentiometer network 15 so that upon rotation of the motor, the movable contact 13 is adjusted in the proper direction to return the potentiometer movable contact 13 to a balanced condition.

As is understood by those skilled in this art, a pen may be mounted so as to move with the movable contact 13 and arranged to cooperate with a recording chart whereby a continuous record of temperature is provided. The chart may be driven by a motor, or other suitable means, so that a time record of temperature is obtained.

To prevent overshooting of the slider as it moves to a new balance point, I employ a novel damping arrangement which comprises a D.-C. generator 81 which is mechanically coupled to the reversible motor 12 through suitable linkage 82, shown in broken lines in FIGURE 1. (Details of the linkage 82 are shown in FIGURE 2.) The generator may comprise a moving coil mechanism of the D'Arsonval type, as shown, or a moving magnet type, if desired. It will be understood that the linkage 82 for coupling the reversible motor 12 to the moving element, designated 83, of the instrument provides a full ninety (90) degrees angular displacement of the moving element for full displacement of the movable arm 13 in the potentiometric network 15. Thus, it will be understood, that the movement of the coil 83, in the magnetic flux field produced by the magnet 84 of the D'Arsonval type mechanism shown, generates in the coil a D.-C. potential having a polarity dependent on the direction of the movement and a magnitude which is directly proportional to the speed thereof.

The output from the movable coil 83 is connected across a potentiometer 86, one end of which is connected to the common ground connection 69. The movable arm of the potentiometer and the grounded end thereof, are connected to the stationary contacts 33, 33 of the damping circuit chopper mechanism where the D.-C. damping signal from the D.-C. generator 81 is converted to an A.-C. signal of the same frequency as the A.-C. error signal. The output of the chopper, from the movable arm 30 thereof, is connected to the control grid 87 of a damping signal amplifier tube 88. The amplified damping signal from the anode 89 of the tube 88 is connected through a coupling capacitor 91 and isolating resistor 92 to the control grid 93 of the tube 53 in the intermediate stage of amplification of the amplifier 11.

Reference is now made to FIGURE 2 wherein the linkage designated 82 is shown in detail. It will be seen that a pulley 96 is mounted upon the shaft 21 of the potentiometric network 15. The shaft 21, as mentioned above, is adapted to be driven through suitable linkage (not shown in FIGURE 2) by the motor 12; the linkage between the motor 12 and shaft 21 being such that the shaft, and attached movable arm 13, rotate through an angle of approximately 340 degrees. The pulley 96 is adapted to drive a pulley 97 through a cable 98. The ratio of pulley sizes is such that with full angular movement of the contact 13 over the slidewire 14 of approximately 340 degrees, the pulley 97 is rotated approximately 90 degrees. It will be seen that the pulley 97 is mounted upon a staff 98 upon which the movable coil 83 of the D.-C. generator movement is mounted. The staff 98 is suitably mounted for pivotal movement within pivot and ring jewel bearings 99 and 101, respectively. Since the coil 83 is positioned in a steady magnetic flux field provided by the magnet 84, pivotal movement of the coil results in a D.-C. potential being developed therein having a polarity dependent upon the direction of coil rotation and a magnitude dependent upon the rate of pivotal movement.

Referring now again to FIGURE 1, whenever the motor 12 is in movement during a balancing operation, a D.-C. damping signal is developed by the D.-C. generator 81, converted to an A.-C. signal by the chopper 27, amplified by the amplifier tube 88, and fed to the grid 93 of the intermediate stage tube 53 in phase opposition to the A.-C. error, or control, signal thereat. As mentioned above, the amplifier 11 has an extremely high gain and will saturate with only a small error signal input. In effect, then, any potential unbalance large enough to produce visible motion of the slidewire contact 13 will saturate the amplifier. The damping signal at the intermediate stage of amplification will not be felt when the amplifier is saturated and, therefore, the speed of response of the system to an instantaneous unbalance signal, for all practical purposes, is unaffected by the damping network. Damping of the system is effected only when a predetermined ratio of damping signal to error control signal is reached.

For practical purposes, the damping signal affects the signal to the motor 12 from the amplifier 11 only when the D.-C. input unbalance potential between the thermoelement 17 and potentiometric network 15 is decreasing toward zero. As soon as the ratio of the A.-C. error control and damping signals is such that the amplifier 11 is not saturated, the damping signal becomes effective to reduce the amplifier output signal and so reduce the speed at which the motor 12 rotates. When the D.-C. signal which results from a potentiometric unbalance decreases to a point where the damping signal becomes effective, motor braking takes place. A point is reached in the braking action wherein the damping signal dominates and the amplifier output reverses polarity whereby the current which is fed to the motor produces an opposite torque in the motor thus causing braking action. The inertia of the motor, and attached mechanical system, maintains the direction of motor rotation the same although a reverse torque is produced in the motor. The damping circuit potentiometer 86 is adjusted such that oscillations, overshoot, and creep-in of the movable contact 13 at the point of balance is eliminated.

The novel feedback arrangement of my invention affords several advantages over many of the prior art damping systems. In the first place, it will be understood that both the sensitivity setting of the system and the damping signal level are independently adjustable. In many prior art installations, the damping signal is connected to the input of the amplifier through the chopper contacts which carry the unbalance, or error, signal. With such prior art arrangements, it will be apparent that both the damping signal and error signal would be changed with changes in setting of the sensitivity potentiometer 57. Since the necessary damping signal level is primarily dependent upon the mechanical characteristics of the system, such prior art arrangements are unsatisfactory. By connecting the damping signal from the generator to an intermediate stage of amplification of the amplifier 11 through an independent set of contacts in a chopper circuit, I avoid any interaction between the damping signal and error signal adjustments. At the same time, the damping signal is also independent of variations in the external impedance connected to the instrument measuring circuit. The damping signal is thereby independent of the recorder and/or control range of the instrument.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. In a motor control apparatus, a controlled motor, a control signal source, a high-gain amplifier which saturates at low values of control signal, the said amplifier including a plurality of stages of amplification connecting the said control signal source to the said controlled motor, a source of motor damping signal having a D.-C. output signal proportional to the speed of rotation of the said motor and of a polarity dependent upon the direction of rotation of the motor, and means connecting the said motor damping signal to the said amplifier at an intermediate stage of amplification thereof, the said damping signal having no effect on the amplifier output so long as the amplifier is saturated.

2. The invention as recited in claim 1 wherein the said source of motor damping signal comprises a coil movable in a direct magnetic flux field, and means mechanically connecting the said coil to the said controlled motor for movement of the coil by the motor.

3. In a motor control apparatus, a controlled motor, a control signal source, a high-gain amplifier which saturates at low values of control signal, the said amplifier including a plurality of stages of amplification connecting the said control signal source to the said controlled motor, means driven by the said controlled motor to produce a damping signal proportional to the speed of the said controlled motor, and means connecting the said damping signal to an intermediate stage of amplification of the said amplifier in phase opposition to the said control signal thereat, the said damping signal having no effect on the amplifier output so long as the amplifier is saturated.

4. In a motor control apparatus, a D.-C. control signal source, a high-gain amplifier which saturates at low values of control signal, the said amplifier including a plurality of stages of amplification, converter means converting the D.-C. control signal to an A.-C. control signal, the said D.-C. control signal source being connected to the first stage of amplification of the said amplifier through the said converter means, a controlled motor connected to the output of the said amplifier, a source of motor damping signal having a D.-C. output signal proportional to the speed of rotation of the said motor, means converting the D.-C. output signal from the source of motor damping signal to an A.-C. damping signal of the same frequency as the A.-C. control signal, and means connecting the A.-C. damping signal to a stage of amplification of the said amplifier following the first stage of amplication in phase opposition to the said A.-C. control signal thereat, the said damping signal having no effect on the amplifier output so long as the amplifier is saturated.

5. The invention as recited in claim 4 wherein the said source of motor damping signal comprises an instrument of the D'Arsonval type having a coil mechanically coupled to the said controlled motor for rotation thereby.

6. The invention as recited in claim 4 wherein the said converter means and means converting the D.-C. output signal from the source of motor damping signal comprises a chopper circuit including a pair of synchronously movable contacts, the said D.-C. control signal source being connected to one of the said chopper contacts and the D.-C. output signal from the source of motor damping signal being connected to the other of the said chopper contacts.

References Cited in the file of this patent

UNITED STATES PATENTS

| | | |
|---|---|---|
| 2,595,034 | Wild | Apr. 29, 1952 |
| 2,801,805 | Johnson | Aug. 6, 1957 |
| 2,802,160 | Engeler | Aug. 6, 1957 |

OTHER REFERENCES

"Servomechanism Practice," by W. R. Ahrendt, McGraw-Hill, 1954, pp. 78 and 116–126.